United States Patent [19]

Nagamatsu et al.

[11] Patent Number: 5,067,931
[45] Date of Patent: Nov. 26, 1991

[54] SPROCKET WHEEL HAVING REPLACEABLE TEETH

[75] Inventors: Hiromitsu Nagamatsu; Seitaro Ueda, both of Kumagaya, Japan

[73] Assignee: Hitachi Metals, Ltd., Tokyo, Japan

[21] Appl. No.: 588,626

[22] Filed: Sep. 26, 1990

[30] Foreign Application Priority Data

Nov. 30, 1989 [JP] Japan ................................ 1-312460

[51] Int. Cl.$^5$ .............................................. F16H 9/00
[52] U.S. Cl. .................................................. 474/162
[58] Field of Search ........................ 474/162, 163, 153

[56] References Cited

U.S. PATENT DOCUMENTS 3,996,814 12/1976 Westlake .............................. 474/162
4,531,926 7/1985 Reeves, Jr. ...................... 474/162 X

FOREIGN PATENT DOCUMENTS 59-195246 12/1984 Japan .
61-19162 2/1986 Japan .
61-28862 7/1986 Japan .
63-15360 2/1988 Japan .
64-53564 4/1989 Japan .
1-21242 6/1989 Japan .
1-21243 6/1989 Japan .

Primary Examiner—Thuy M. Bui
Attorney, Agent, or Firm—Sughrue, Mion, Zinn, Macpeak & Seas

[57] ABSTRACT

A sprocket wheel having replaceable teeth includes a wheel body, a plurality of replaceable teeth, and fixing members to fix each tooth to the wheel body. In the outer periphery of the wheel body are formed a plurality of notches regularly spaced from each other. Each replaceable tooth consists of a central portion which forms a tooth groove on the upper surface and which fits into the notch of the wheel body, and two flanges formed in right and left sides of the central portion. The right and the left flanges can be formed ahead of and behind the central portion of the tooth respectively. Each fixing member can consist of an internal thread formed in each flange of the tooth, a bolt hole formed in each side of the notch, and a bolt having a head thinner than the flange.

6 Claims, 6 Drawing Sheets

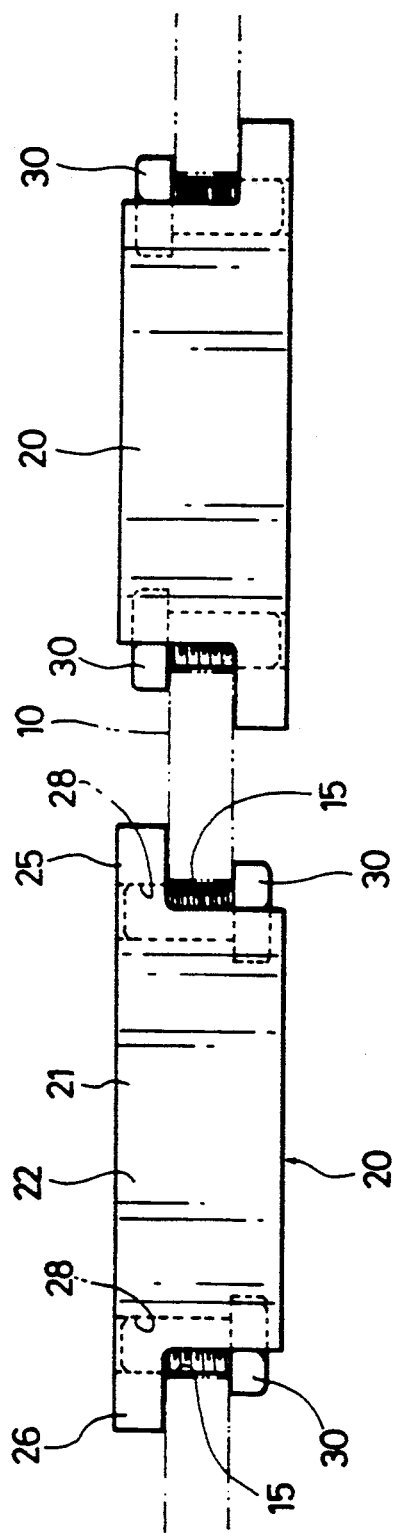
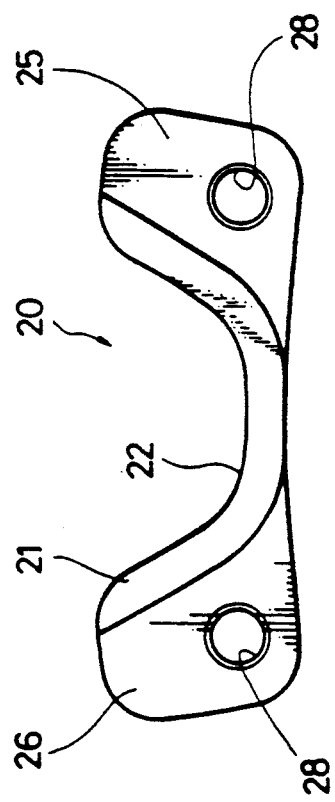

SPROCKET WHEEL HAVING REPLACEABLE TEETH

BACKGROUND OF THE INVENTION

1. Field of the Invention

This invention relates to a sprocket wheel having a plurality of replaceable or detachable teeth mounted to the wheel body.

2. Description of the Prior Art

A sprocket wheel having replaceable teeth is disclosed, for example, in Japanese Utility Model Laid-Open No. 1984-195246, which is shown in FIGS. 10 through 12, where the body 40 of the wheel has a plurality of notches 41 which are circumferentially regularly spaced from each other, each notch 41 having a pair of protrusions 42, 42 on both of its top sides. Each replaceable tooth is divided into a pair of parts 45, 45, each part 45 being provided with a tooth groove 46 on its upper surface which is used to engage with a chain (not shown), a pair of notches 47, 47 in both of its top sides which fit over the protrusions 42, 42 of the corresponding notch 41 of the body 40, a notch 48 in its bottom side which fits over the bottom 43 of the corresponding notch 41 of the body 40, and two bolt holes 49, 49 which are used to be threaded by bolts. Each pair of parts 45, 45 mounted to each notch 41 of the body 40 by facing each other, then fixed to the body 40 by bolts and nuts.

Another sprocket wheel having replaceable teeth disclosed in Japanese Utility Model Laid-Open No. 1989-53564 is shown in FIGS. 13 and 14, where the outer periphery of the body 50 is shaped into a circular form. Each replaceable tooth 55 comprises a tooth portion 56 which has a tooth groove 57 on its top surface, and a fixing portion 58 which is located under the tooth portion 56 and integrally formed with it. The replaceable teeth 55 are so disposed that they are regularly spaced from each other and that their fixing portions 58 are attached to one side of the wheel body 50. A bolt is inserted into a hole formed in the fixing portion 58 of each tooth 55 and into one of holes formed in the body 50, then each tooth 55 is fixed to the body 50 by each nut.

In the first-mentioned sprocket wheel, as each replaceable tooth is divided into two parts, a step or a gap may be formed between both tooth grooves of the parts. This creates a possibility that the chain engaging with the grooves is damaged.

In the last-mentioned sprocket wheel, as no notches are formed in the outer periphery of the body, driving or driven force exerted on the wheel is supported by the shearing stress acting on bolts. That is, excessive shearing stress may act on each bolt. With respect to axial thrust load on the sprocket wheel, a thrust load in one direction is sustained by the fixing portion of each replaceable tooth, but a thrust load in the other direction is sustained by bolts and nuts. That is, excessive tensile stress may act on each bolt and nut.

The object of the present invention is thus to provide an improved sprocket wheel having replaceable teeth each of which has an unsplit tooth groove, the wheel withstanding the circumferential driving force and axial thrust load. Other objects and advantages of the present invention will become apparent from the detailed description to follow taken in conjunction with the appended claims.

SUMMARY OF THE INVENTION

In accordance with one aspect of the present invention, there is provided a sprocket wheel having replaceable teeth comprising: a wheel body having a plurality of notches formed in the outer periphery of the wheel body, the notches being regularly spaced from each other; a plurality of replaceable teeth, each tooth consisting of a central portion which formes a tooth groove on the upper surface and which fit into said notch of the wheel body, and right and left flanges which are formed respectively ahead of and behind the central portion, or vice versa; and fixing means by which each flange of each tooth is detachably fixed to each side of each notch of the wheel body. Both right and left flanges can also be formed either ahead of or behind the central portion.

Since each replaceable tooth according to the invention is not split into plural parts, the engaging chain is prevented from getting damaged. Because the central portion of each tooth fits into each notch, the driving or driven force acting on the wheel is transmitted or received on the contacting surface between the central portion of the tooth and the notch of the wheel body. Hence, it is unlikely that any excessive shearing stress will act through the fixing means. Moreover as the fixing means are located at both sides of each central portion, the wheel withstands heavy thrust loads. If the flanges formed on both sides of each central portion are disposed obliquely opposite to each other, the fixing means are more resistant to thrust loads.

BRIEF DESCRIPTION OF THE DRAWINGS

FIG. 8 is a plan view of replaceable teeth according to the fourth embodiment of the present invention;

FIG. 9 is a front elevation of the replaceable tooth shown in FIG. 8;

DETAILED DESCRIPTION OF THE INVENTION

Figure 1:
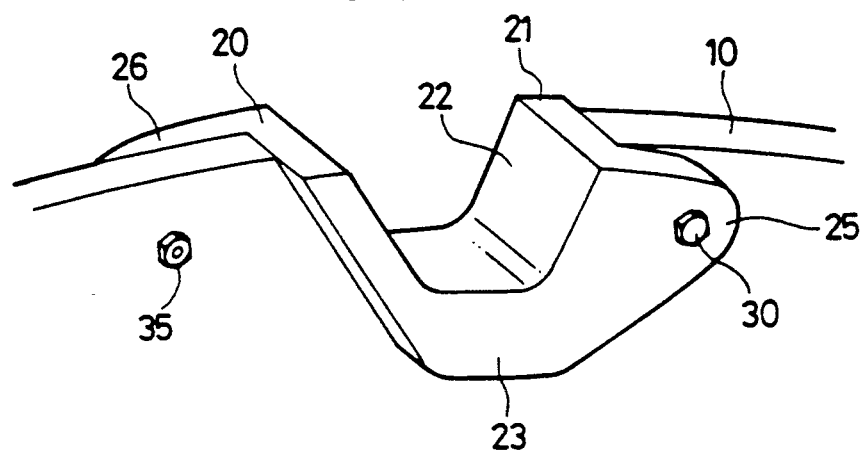
FIG. 1 is a perspective view of main portions of a sprocket wheel according to the first embodiment of the present invention.
Figure 2:
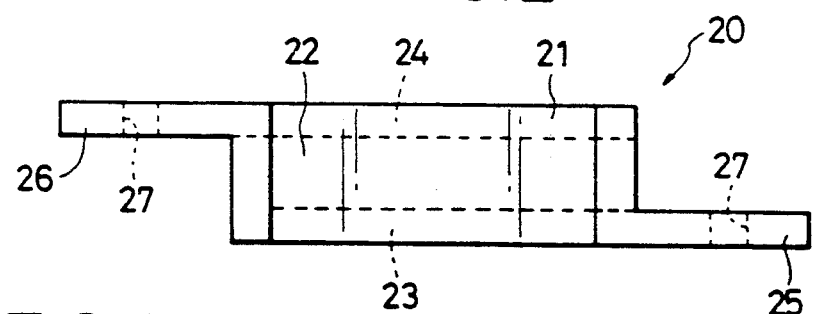
FIG. 2 is a plan view of the replaceable tooth shown in FIG. 1.

Referring to FIGS. 1 through 4, there is shown a sprocket wheel of the first embodiment of the present invention, where the wheel comprises a wheel body 10, a plurality of replaceable teeth 20, and bolts 30 and nuts 35. The wheel body 10 has a plurality of substantially U-shaped notches 11 in its outer periphery. The notches 11 are circumferentially regularly spaced from each other, and the width of each notch 11 tapers toward the inside of the wheel body 10. The body 10 has a pair of bolt holes 15, 15 on both sides of each notch 11. Each replaceable tooth 20 comprises a substantially U-shaped central portion 21, front and rear jaws 23, 24, and right and left flanges 25, 26. The central portion 21 forms a tooth groove 22 on its upper surface, and the lower surface of the central portion 21 is so shaped that it can fit into the notch 11 of the wheel body 10. The front and the rear jaws 23, 24 are formed at the bottom of the central portion 21, and fit over the bottom 12 of the notch 11. The right flange 25 and the left flange 26 are continuously formed with the front 23 jaw and the rear jaw 24, respectively. Alternatively, the right flange 25 and the left flange 26 can otherwise be continuously formed with the rear jaw 24 and the front jaw 23, respectively. The flanges 25, 26 of each tooth 20 are each provided with a bolt hole 27. Each bolt 30 is passed through the bolt hole 27 of the flange and the bolt hole 15 of the body, and tightened with each nut 35. Preferably each tooth 20 is made from stainless steel, synthetic resin, hardened steel, or other similar material. Since each tooth groove 22 of the replaceable tooth 20 is not split into plural parts, the engaging chain (not shown) will not be damaged. Also, as the jaws 23, 24 of the tooth 20 fit over the notch 11 of the wheel body 10, no excessive shearing force will act through each bolt 30.

Figure 3:
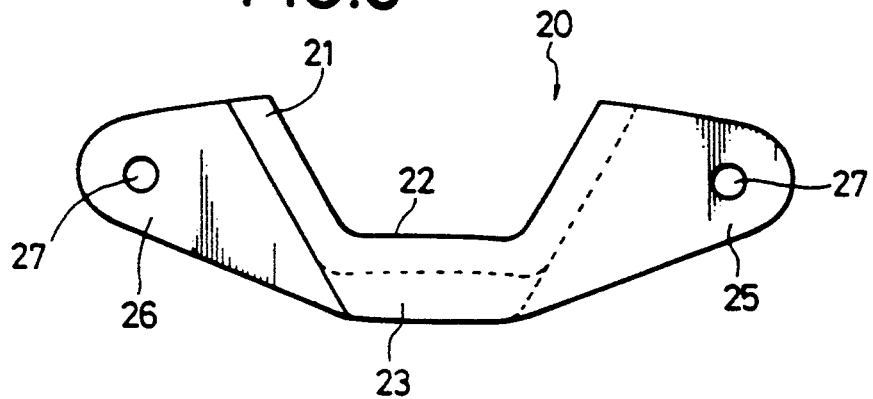
FIG. 3 is a front elevation of the replaceable tooth shown in FIGS. 1 and 2.
Figure 4:
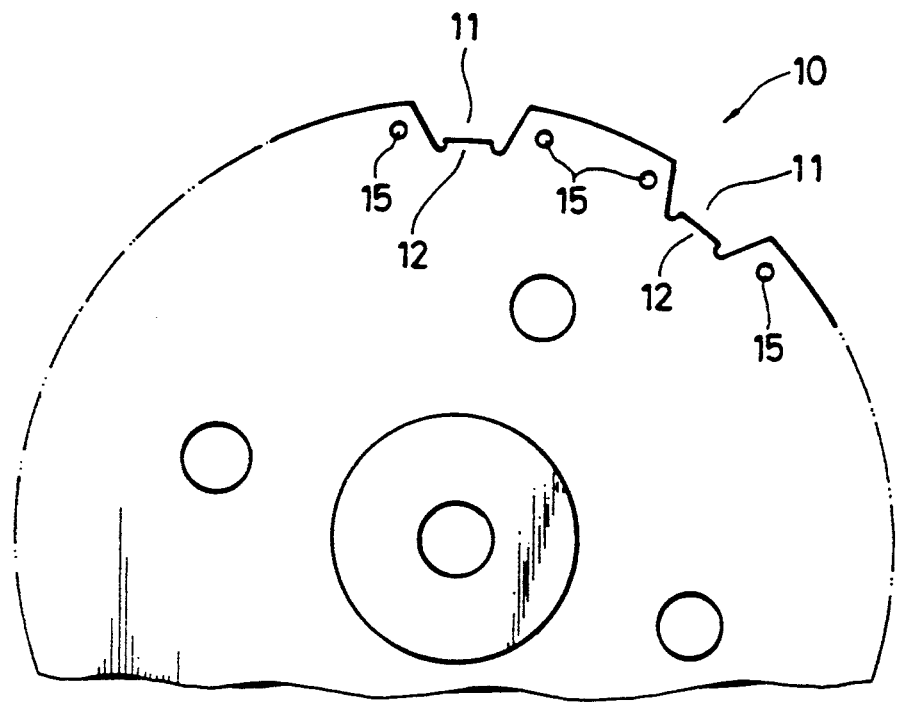
FIG. 4 is a fragmentary front elevation of the body of the sprocket wheel shown in FIG. 1.
Figure 5:
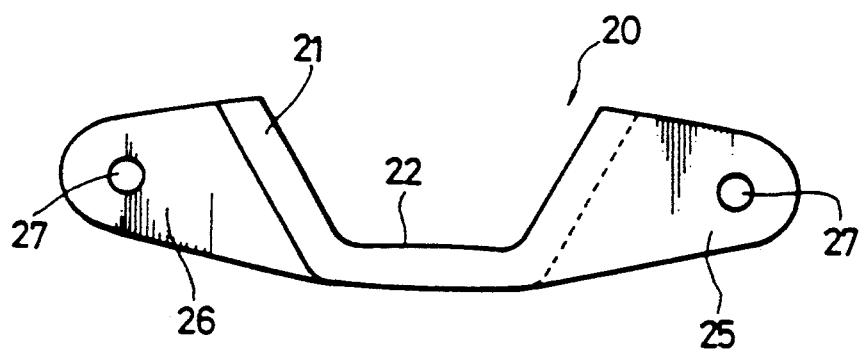
FIG. 5 is a front elevation of a replaceable tooth according to the second embodiment of the present invention.

Referring next to FIG. 5, there is shown a replaceable tooth 20 of the second embodiment of the invention, which is similar to the one shown in FIG. 3 except that the jaws are omitted. That is, the tooth 20 comprises a substantially U-shaped central portion 21 having the tooth groove 22 on its upper surface, and a right flange 25 which is formed in front of the central portion 21 and a left flange 26 which is formed behind the central portion 21. The right flange 25 and the left flange 26 can otherwise be formed behind and in front of the central portion 21, respectively. This replaceable tooth 20 is much easier to manufacture because no recesses or grooves are formed except for the tooth groove 22 of the central portion 21.

Figure 6:
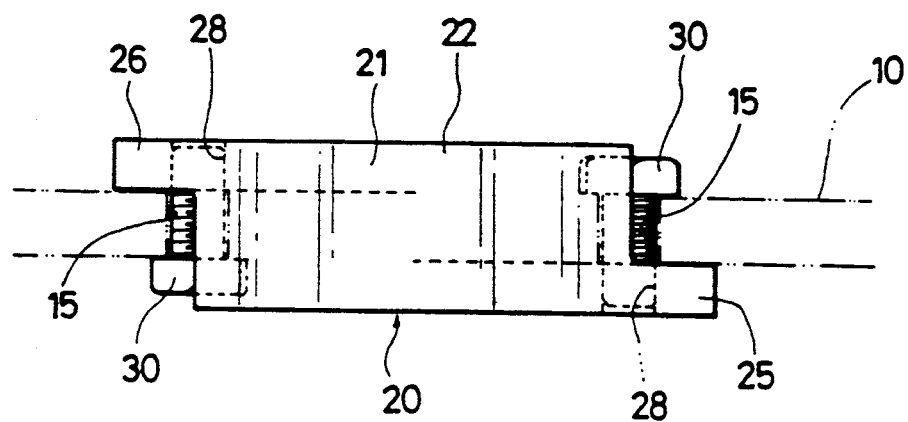
FIG. 6 is a plan view of a replaceable tooth according to the third embodiment of the present invention.
Figure 7:
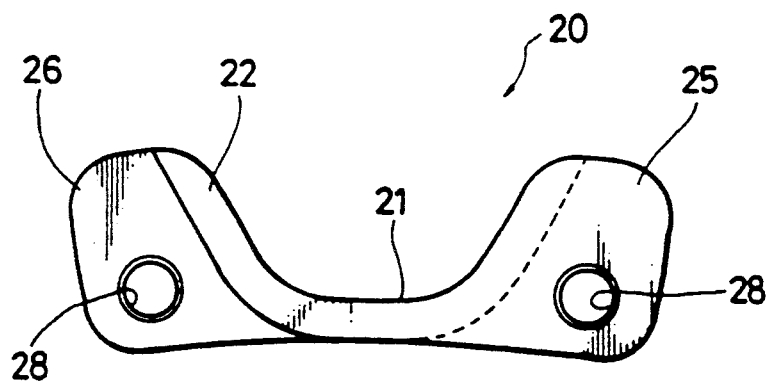
FIG. 7 is a front elevation of the replaceable tooth shown in FIG. 6.
Figure 10:
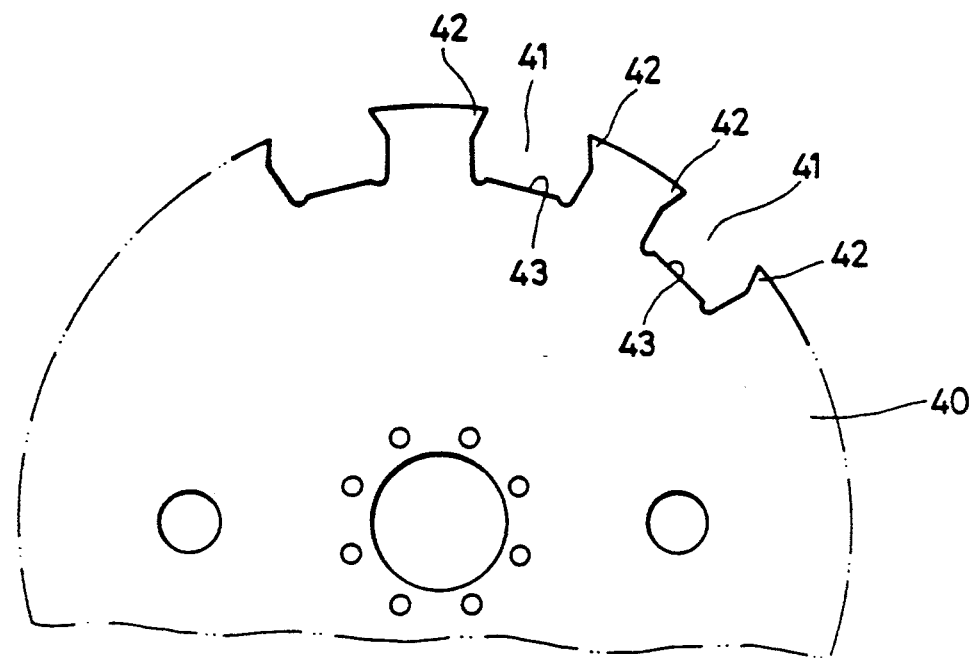
FIG. 10 is a fragmentary front elevation of the body of a conventional sprocket wheel.
Figure 11:
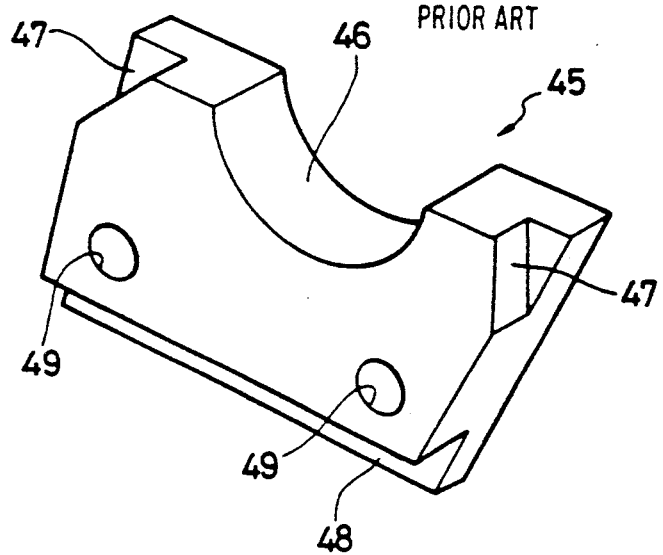
FIG. 11 is a perspective view of a replaceable tooth mounted to the body shown in FIG. 10.
Figure 12:
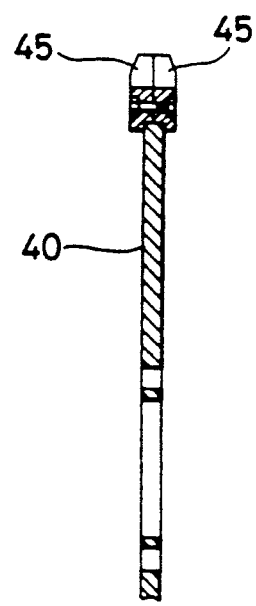
FIG. 12 is a vertical cross section of the sprocket wheel, as assembled, of the body and the teeth shown in FIGS. 10 and 11.
Figure 13:
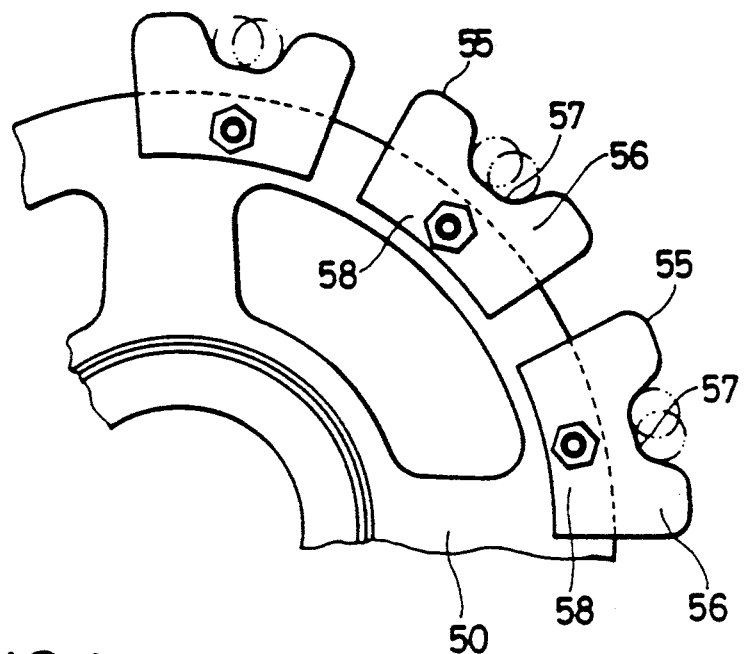
FIG. 13 is a fragmentary front elevation of main portions of another conventional sprocket wheel.
Figure 14:
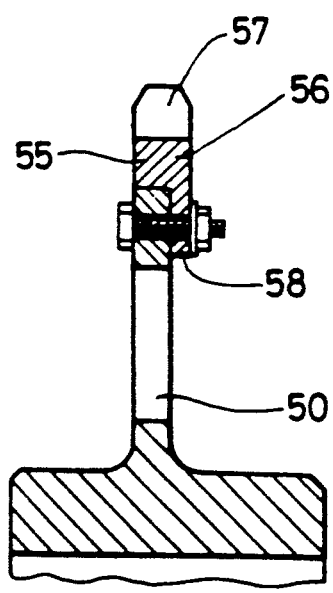
FIG. 14 is a vertical cross section of the sprocket wheel shown in FIG. 13.

Referring to FIGS. 6 and 7, there is shown a replaceable tooth according to the third and the best mode embodiment of the invention. The feature of this tooth resides in the fixing means by which the replaceable tooth is fixed to the body of the sprocket wheel. In the case of the sprocket wheel shown in FIG. 1, as the fixing means were the bolt 30 and the nut 35, either the head of the bolt 30 or the nut 35 protrudes outwardly from the corresponding flange 25 or 26. In the case of FIG. 1, the head of the bolt 30 protrudes. The protruding head or nut may interfere with the chain (not shown). On the other hand, no nut is used in the example shown in FIGS. 6 and 7, and the bolt hole formed in each flange 25 or 26 is provided with an internal thread 28. The bolt 30, having a head thinner than the flange 25 or 26, is passed through the bolt hole 15 formed in the wheel body 10, and then screwed to the internal thread 28 of the flange 25 or 26. In this way an interference with the chain can be avoided.

In the examples described above, the right and the left flanges 25, 26 formed on the opposite sides of the tooth 20 are disposed obliquely opposite to each other.

It is also possible to form both right and left flanges 25, 26 either ahead of or behind the central portion 21. Also in this case, the fixing means preferably prevent interference with the chain. An example satisfying such a requirement is shown in FIGS. 8 and 9. Referring to FIGS. 8 and 9, a replaceable tooth 20 of the fourth embodiment of the invention has a central portion 21, which extends the same distance foward and rearward beyond the front and rear surfaces of the wheel body 10, the same distance being equal to the thickness of flanges 25, 26. The right and the left flanges 25, 26 are both located behind the central portion 21. Each bolt 30, having a head thinner than the flanges 25, 26, pass through the bolt hole 15 of the wheel body 10 and is screwed to the internal thread 28 formed in the flange 25 or 26 to fix the replaceable tooth 20 on the wheel body 10. Although both protrusions of the central portion 21 beyond the front and rear surfaces of the wheel body 10 are equal in this example, they can otherwise be formed unequally. In such case, the head of the bolt 30 is better to be formed thinner than the protrusion of the central portion 21 to the side where the flanges 25, 26 are not formed in order to avoid the interference with chain.

In the example shown in FIGS. 1 through 4 of the first embodiment, a thrust load acting axially of the sprocket wheel is sustained by three parts, i.e., one flange, the jaw continuous with this flange, and the bolt located on the opposite side of the flange. In the examples shown in FIGS. 5 through 7 of the second and the third embodiment, a thrust load is sustained by two parts, i.e., one flange and the bolt located on the opposite side of the flange. In the example shown in FIGS. 8 and 9 of the fouth embodiment, a thrust load is sustained differently according to the direction of the load. In particular, a load acting in one direction (downward direction in FIG. 8) is sustained by the flanges 25, 26, and a load acting in the opposite axial direction is sustained by two bolts 30. Accordingly, any example is more resistant to the thrust loads than heretofore. In the example of the fourth embodiment, the replaceable teeth 20 can be alternately reversed in direction and mounted to the wheel body 10 as shown in FIG. 8 in order to sustain a thrust load acting in the opposite direction in a less different manner. But to do so, both protrusions of the central portion 21 beyond the front and rear surfaces of the wheel body 10 should be equal as shown in FIG. 8.

As described above the inventive sprocket wheel having replaceable teeth prevents the engaging chain from becoming damaged, and withstands the driving or driven force and thrust loads as well. Although the embodiments of the present invention have been described above, various modifications are possible without departing from the spirit of the invention which is defined solely in the appended claims.

What is claimed is:

1. A sprocket wheel comprising:
   a wheel body having an outer periphery and a plurality of notches formed in the outer periphery of the wheel body, the notches being regularly spaced from each other;
   a plurality of replaceable teeth, each tooth consisting of a central portion having an upper surface which forms a tooth groove, said central portion being fitted into said notch of the wheel body, and right and left flanges which are formed respectively ahead of and behind the central portion, or vice versa; and fixing means by which each flange of each tooth is detachably fixed to each side of each notch of the wheel body.

2. The sprocket wheel of claim 1, wherein each replaceable tooth has front and rear jaws which are continuously formed with a respective flanges at a bottom of said central portion to fit over a bottom of said notch of the wheel body.

3. The sprocket wheel of claim 1 or 2, wherein each of said fixing means consists of an internal thread formed in each flange of each tooth, a bolt hole formed in each side of each notch, and a bolt having a head thinner than said flange.

4. A sprocket wheel comprising:

a wheel body having an outer periphery and a plurality of notches formed in the outer periphery of the wheel body, the notches being regularly spaced from each other;

a plurality of replaceable teeth, each tooth consisting of a central portion having an upper surface which forms a tooth groove, said central portion being fitted into said notch of the wheel body, and right and left flanges which are formed either ahead of or behind the central portion; and fixing means by which each flange of each tooth is detachably fixed to each side of each notch of the wheel body.

5. The sprocket wheel of claim 4, wherein said central portion of each replaceable tooth protrudes beyond a side of the wheel body where said flanges are not formed, and wherein each of said fixing means consists of an internal thread formed in each flange of each tooth, a bolt hole formed in each side of each notch, and a bolt having a head thinner than the amount of said protrusion to the side where said flanges are not formed.

6. The sprocket wheel of claim 5, wherein said amount of the protrusion is equal to the thickness of said flanges, and wherein the replaceable teeth are alternately reversed in direction and mounted to the wheel body.

* * * * *